June 26, 1956  A. N. EMMONS ET AL  2,751,942
CUTTER ARBOR SHAFT FOR PORTABLE POWER OPERATED TOOLS
Filed April 10, 1952

INVENTOR.
ARTHUR N. EMMONS
WALTER A. PAPWORTH
BY
D. Emmett Thompson
ATTORNEY

United States Patent Office 2,751,942
Patented June 26, 1956

2,751,942

CUTTER ARBOR SHAFT FOR PORTABLE POWER OPERATED TOOLS

Arthur N. Emmons, Nedrow, and Walter A. Papworth, Syracuse, N. Y., assignors to Porter-Cable Machine Company, Syracuse, N. Y., a corporation of New York Application April 10, 1952, Serial No. 281,635

1 Claim. (Cl. 143—155)

This invention relates to cutter arbor shaft structures for portable power operated tools, such as electrically operated portable power hand saws. It is advantageous to form the cutter arbor shafts in these portable power saws with a short or stub projection for supporting saw blades of normal thickness. However, upon occasion it is desirable to use cutters on these machines of substantial width—for example, dado cutters used for grooving.

This invention has an object a cutter arbor shaft structure embodying an arrangement by which the shaft proper is adapted to support saw blades of normal thickness, and which may be extended to support cutters of different and substantial thicknesses.

The invention consists in the novel features and in the combinations and constructions hereinafter set forth and claimed.

In describing this invention, reference is had to the accompanying drawings in which like characters designate corresponding parts in all the views.

In the drawings—

Figure 1:
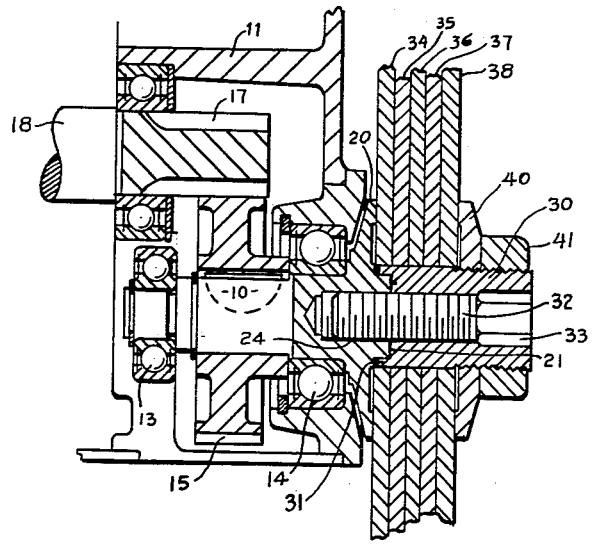
Figure 1 is a vertical sectional view of a cutter arbor shaft embodying our invention and showing in the view contiguous portions of a power operated hand saw. In this view, a dado cutter consisting of five cutting elements is mounted upon the arbor shaft extension member.

In Figure 1, there is illustrated an arbor shaft 10 journalled in the housing 11 of a portable power operated hand saw of the type disclosed in the Emmons Patent No. 1,848,330, issued March 8, 1932. The arbor shaft 10 is journalled in antifriction bearings 13, 14. A driven gear 15 is fixedly mounted on the shaft 10 intermediate the bearings 13, 14, and is arranged in mesh with a pinion 17 formed on the end of the motor shaft 18. The arbor shaft 10 is formed with an integral radially extending flange 20 and with a short cylindrical portion 21 extending outwardly from the flange and adapted to support a saw blade of normal thickness. The arbor shaft 10 is formed at its outer end with a threaded hole 24 to receive a cap screw, not shown, for detachably securing the saw blade on the stub portion 21 of the arbor shaft.

The shaft structure shown includes a cylindrical extension member 30 somewhat larger in diameter than the cylindrical stub portion 21 and being formed with an annular flange 31 encircling the stub portion 21 of the shaft, this flange abutting against the central portion of the flange 20.

The extension 30 is provided with screw means for detachably securing it to the arbor shaft 10. In Figure 1, the extension member 30 is formed centrally with a threaded aperture in which there is fixedly mounted a threaded stud 32, as by brazing. The outer end portion 33 of the aperture in the member 30 is formed of irregular shape to receive a tool, or wrench, for tightening the stud 32 of the member 30 into the shaft 10, clamping the member against the arbor shaft 10.

Figure 2:
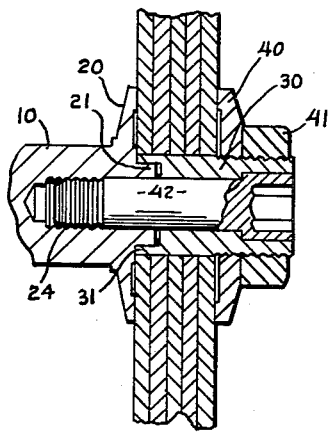
Figure 2 is a view, similar to Figure 1, of a slightly modified structure for detachably mounting the extension member to the arbor shaft proper.

The member 30 is of sufficient length to accommodate a cutter of substantial width as, for example, a dado cutter comprising the sections 34, 35, 36, 37 and 38, these sections being clamped against the flange 20 by a collar 40 and a nut 41 threading on the outer end portion of the member 30. In Figure 2, the member 30 is mounted on the shaft 10 by means of a pilot screw 42 extending through the member and being threaded into the bore 24. With this arrangement, the outer portion of the aperture formed in the shaft 10 is provided with a counterbore for snug engagement with the screw 42, and the screw 42 is a snug fit in the member 30.

In both arrangements, the extension 30 is clamped squarely against the arbor shaft or the flange 20 thereof and is adequately supported by the flange 31 encircling the stub portion 21 of the arbor shaft and by the stud 32, or the screw 42.

What we claim is:

A cutter arbor shaft structure for portable power operated tools comprising an arbor shaft formed with a radial cutter engaging flange and having a short cylindrical cutter supporting portion extending outwardly from said flange for supporting a saw blade of normal thickness, a cylindrical extension member of uniform diameter for supporting wide cutters, said member being formed with an annular flange encircling the cylindrical portion of the arbor shaft and abutting against said radial flange, said arbor shaft being formed with a bore extending axially inwardly from the outer end thereof, the inner portion of said bore being provided with an internal thread, a screw member extending through said extension member into said bore and being threaded into said arbor shaft and being cooperable to clamp said extension member against said flange, and a nut and washer assembly mounted on the outer end portion of said extension for clamping said wider cutter against said first mentioned flange.

References Cited in the file of this patent

UNITED STATES PATENTS

| 331,771 | Corson | Dec. 8, 1885 |
| 817,568 | Huther | Apr. 10, 1906 |
| 1,794,758 | Dittmar | Mar. 3, 1931 |
| 2,646,090 | Kluck | July 21, 1953 |

FOREIGN PATENTS

| 15,992 | Norway | July 13, 1906 |